(12) United States Patent
Bode

(10) Patent No.: US 9,130,417 B2
(45) Date of Patent: Sep. 8, 2015

(54) ELECTRIC MACHINE, IN PARTICULAR A CANNED ELECTRIC MOTOR

(75) Inventor: Ralf Bode, Moers (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 313 days.

(21) Appl. No.: 13/509,316

(22) PCT Filed: Nov. 11, 2010

(86) PCT No.: PCT/EP2010/067284
§ 371 (c)(1),
(2), (4) Date: May 11, 2012

(87) PCT Pub. No.: WO2011/058097
PCT Pub. Date: May 19, 2011

(65) Prior Publication Data
US 2012/0223605 A1  Sep. 6, 2012

(30) Foreign Application Priority Data
Nov. 12, 2009 (DE) .......................... 10 2009 052 932

(51) Int. Cl.
*H02K 5/128* (2006.01)
*H02K 5/124* (2006.01)

(52) U.S. Cl.
CPC ................ *H02K 5/124* (2013.01); *H02K 5/128* (2013.01)

(58) Field of Classification Search
CPC .................................. H02K 5/128; H02K 5/12
USPC .............................................. 310/86, 87, 88
IPC ....................................................... H02K 5/128
See application file for complete search history.

(56) References Cited

U.S. PATENT DOCUMENTS

| | | | | |
|---|---|---|---|---|
| 4,227,108 A | * | 10/1980 | Washizu et al. | 310/214 |
| 6,177,741 B1 | | 1/2001 | Lutkenhaus | |
| 6,570,277 B2 | * | 5/2003 | Tsuneyoshi et al. | 310/54 |
| 7,411,326 B2 | * | 8/2008 | Achor et al. | 310/68 B |
| 7,575,422 B2 | * | 8/2009 | Bode et al. | 417/423.12 |

FOREIGN PATENT DOCUMENTS

| | | |
|---|---|---|
| CN | 101009444 A | 8/2007 |
| DE | 3931988 | 4/1991 |

(Continued)

OTHER PUBLICATIONS

Machine Translation, Meyer et al., EP 1271747 A1, Jan. 2, 2003.*

(Continued)

*Primary Examiner* — Thomas Truong

(57) ABSTRACT

An electric machine includes a rotor, a stator housing and a winding assembly surrounding the rotor. The winding assembly is arranged in the stator housing and has an axially extending effective region in which the winding assembly is set up to interact electrodynamically with the rotor. The stator housing has a peripheral opening slot on the side facing the rotor. The opening slot corresponds in its axial extent to the axial extent of the effective region of the winding assembly and in which an electrically non-conductive can of the electric machine is inserted. The can is sealed off with the stator housing in such a manner that the winding assembly is hermetically separated from the rotor. The can extends axially only on the effective region of the winding assembly.

11 Claims, 1 Drawing Sheet

(56) References Cited

FOREIGN PATENT DOCUMENTS

| | | | |
|---|---|---|---|
| DE | 3931988 A1 | 4/1991 | |
| DE | 4138268 A1 | 5/1993 | |
| EP | 0543280 A2 | 5/1993 | |
| EP | 1271747 A1 | 1/2003 | |
| FR | 2087127 A5 | 12/1971 | |
| GB | 773827 A * | 1/1957 | ................ F04D 1/06 |
| GB | 963880 A | 7/1964 | |
| GB | 1075050 A * | 7/1967 | ............... H02K 1/14 |
| GB | 1330674 A | 9/1973 | |
| JP | 56161961 U | 12/1981 | |
| JP | 59129553 A | 7/1984 | |
| RU | 2043691 C1 | 9/1995 | |
| RU | 2095920 C1 | 5/1996 | |
| RU | 2231185 C2 | 6/2004 | |
| SU | 1309188 A1 | 5/1987 | |
| WO | WO 8500475 A1 | 1/1985 | |

OTHER PUBLICATIONS

USPTO Translation, Washizu, JP 59129553 A, Jul. 25, 1984.*

* cited by examiner

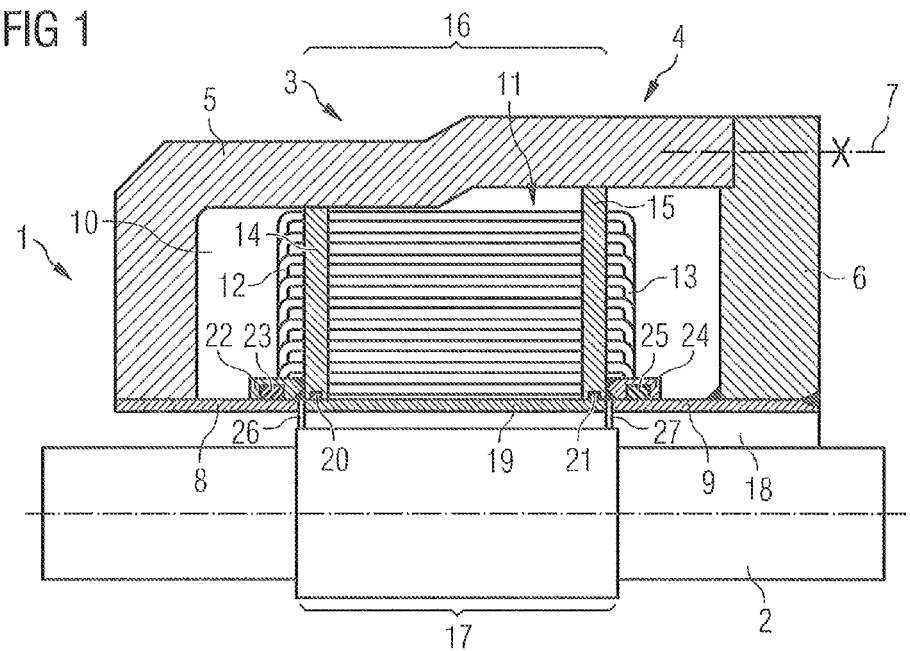
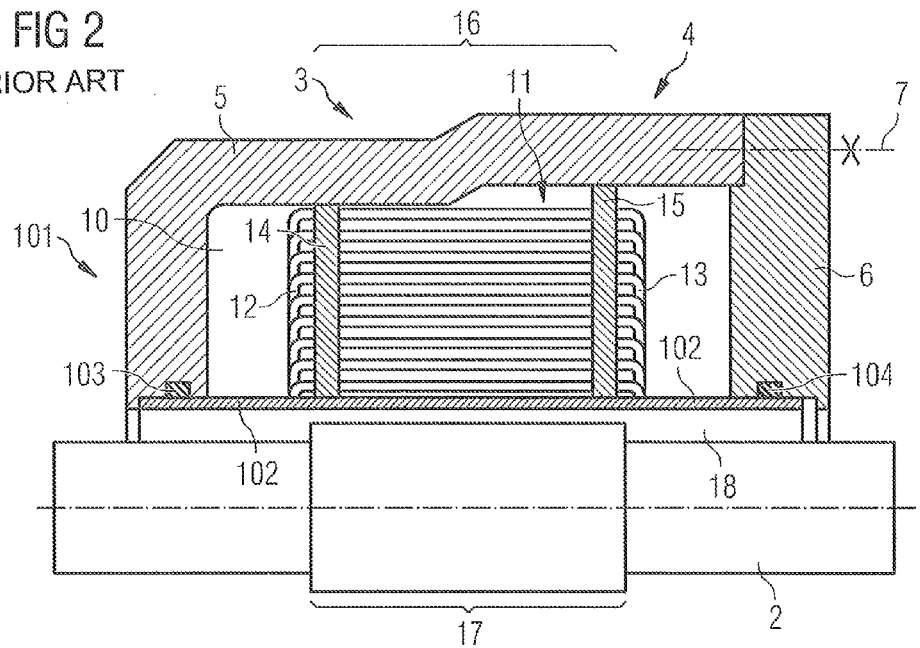

US 9,130,417 B2

ELECTRIC MACHINE, IN PARTICULAR A CANNED ELECTRIC MOTOR

CROSS REFERENCE TO RELATED APPLICATIONS

This application is the US National Stage of International Application No. PCT/EP2010/067284, filed Nov. 11, 2010 and claims the benefit thereof. The International Application claims the benefits of German application No. 10 2009 052 932.2 DE filed Nov. 12, 2009. All of the applications are incorporated by reference herein in their entirety.

FIELD OF INVENTION

The invention relates to an electrical machine, in particular a canned electric motor.

BACKGROUND OF INVENTION

An electrical machine, in particular a canned electric motor, has a stator and a rotor, which are in electrodynamic interaction, whereby the rotor is driven. For example, the canned electric motor is used to drive a turbo compressor or a rotary pump. If the conveyance media of the turbo compressor or the rotary pump are appropriately cold, they can be used for cooling the canned electric motor. Cooling the rotor using a processing gas and the stator using a processing liquid is known. The canned electric motor has a can, which extends cylindrically around the rotor and thus hermetically separates the rotor from the stator, so that the processing gas can wash around the rotor and the processing liquid can wash around the stator. In order to prevent disadvantageous eddy current losses in the can, which would reduce the efficiency of the canned electric motor, the can is produced from an electrically nonconductive material. However, the presence of the can results in a gap enlargement between the rotor and the stator, whereby the efficiency of the canned electric motor is decreased. It would therefore be desirable to make the can as thin-walled as possible, whereby the strength of the can is reduced, however. This is problematic in particular if the cooling media for the rotor and the stator have high pressure differences and/or high temperature differences, so that, for example, in corresponding applications, a maximum permissible buckling strength of the can could be exceeded.

An electric medium frequency motor having a liquid-flooded stator is known from EP 1 271 747 A1, which is separated by a can from the rotor, which is mounted liquid-tight in bearing flanges. The can has a greater thickness on two side parts than on a middle part, whereby the side parts have a higher thermal conductivity than the middle part and contact the bearing flanges on both sides in a formfitting and removable manner.

An electric motor which is water-cooled in the stator chamber and air-cooled in the rotor chamber is known from DE 41 38 268 A1, in which the cooling water washes directly around the windings located in the stator grooves. The stator sheet assembly is delimited toward the rotor chamber by pressure-resistant inner housing wall faces, which absorb the bearing forces of the roller-bearing-mounted rotor shaft.

SUMMARY OF INVENTION

The object of the invention is to provide an electrical machine, in particular a canned electric motor, wherein the electrical machine has both a high strength and also a high efficiency.

The electrical machine according to the invention has a stator housing and a winding assembly, enclosing a rotor of the electrical machine, which winding assembly is arranged in the stator housing and has an axially extending effective region in which the winding assembly is configured to interact electrodynamically with the rotor, wherein the stator housing has a peripheral opening slot on the side facing toward the rotor, which opening slot corresponds in its axial extension to the axial extension of the effective region of the winding assembly and in which an electrically nonconductive can of the electrical machine is inserted, which is sealed with the stator housing in such a manner that the winding assembly is hermetically separated from the rotor, wherein the can extends axially only on the effective region of the winding assembly.

The can is made electrically nonconductive, so that, for example, no eddy currents can be induced in the can because of the electrodynamic interaction between the effective region of the winding assembly and the rotor.

The property of the electrical non-conduction of the can is only necessary in the region of the axial extension of the effective region of the winding assembly, so that according to the invention the can advantageously only extends axially on the effective region of the winding assembly. The other extension regions of the winding assembly, which cannot be assigned to its effective region, are advantageously insulated from the rotor on the radially internal side of the winding assembly via the stator housing. The can therefore has the minimum required axial extension, whereby the can has a high buckling strength. The winding assembly can be liquid-cooled by the flow of a cooling liquid around it, for example, while the rotor is gas-cooled by the flow of cooling gas around it, in contrast. Because of possibly occurring extreme thermodynamic states of the cooling gas and the cooling liquid, the can is accordingly to be designed with a high strength, wherein a corresponding thickness of the can results therefrom. Because the can only extends axially on the effective region of the winding assembly, the axial extension of the can is as small as possible, whereby the thickness of the can can also be selected to be small in regard to its strength. The interference with the electrodynamic interaction between the winding assembly and the rotor is therefore reduced, whereby the efficiency of the electrical machine is high and nonetheless the electrical machine has a high strength.

The stator housing preferably has two housing rings, which enclose the rotor on the radial interior and are arranged in an axial spacing to one another so that the housing rings extend up to the effective region of the winding assembly, wherein the opening slot is delimited by the housing rings. It is preferable in this case for the housing rings and the can to have the same diameter. The stator housing preferably has a housing pot and a housing lid which closes the housing pot, wherein one of the housing rings is attached to the housing pot and the other of the housing rings is attached to the housing lid. It is preferable for one housing ring to be welded on the housing pot and the other housing ring to be welded on the housing lid. A stable, easily producible and installable design of the stator housing is thus achieved.

Furthermore, it is preferable for the winding assembly to have a winding head arranged axially on the end in each case, which is not to be included in the effective region of the winding assembly. For example, sections in the winding assembly, in which a conductor is guided in such a manner that an electrodynamic interaction with the rotor occurs little or not at all, are to be included in the winding head. For example, this relates to regions of the winding assembly in which a conductor of the winding assembly is deflected in a deflection section from the axial direction into the peripheral direction. The deflection sections are arranged at the level of the housing rings viewed in the axial direction, while in contrast straight sections of the conductor are arranged in the region of the can.

The winding assembly preferably has at least one winding stand, using which the winding assembly is supported per se and in relation to the stator housing, wherein each winding stand is arranged on one of the axial delimitations of the effective region and extends radially up to the adjacent axial end of the can. The radially internal end of each winding stand is preferably hermetically sealed both with the axial end of the can arranged adjacent and also with the housing ring arranged adjacent. A sealing ring carrier is preferably fastened in a hermetically sealed manner on each of the winding stands for sealing the radially internal end of each winding stand with the can arranged adjacent, wherein a sealing ring for sealing the winding carrier in relation to the housing ring is arranged between the sealing ring carrier and the housing ring arranged adjacent. Furthermore, a sealing ring for hermetically sealing the winding stand in relation to the can is preferably arranged in each case between the radially internal end of each winding stand and the axial end of the can arranged adjacent.

The stator housing is preferably produced from metal and the can is preferably produced from fiber composite material. The fiber composite material is electrically nonconductive, wherein suitable metal alloys for producing the housing can be selected accordingly for the metal. The fiber composite material from which the can is produced is therefore only used at the points in the electrical machine at which its functional properties with respect to the electrical non-conduction are required. In the remaining regions of the electrical machine, the metal of the stator housing is used, which has higher and therefore better strength properties than the fiber composite material of the can, wherein there is no effect which decreases the efficiency due to the electrical conductivity of the metal of the stator housing. The electrical machine is preferably a canned electric motor.

BRIEF DESCRIPTION OF THE DRAWINGS

A preferred exemplary embodiment of an electrical machine according to the invention is explained hereafter on the basis of the appended schematic drawings. In the figures:

FIG. 1 shows a longitudinal section of an embodiment according to the invention of the electrical machine and FIG. 2 shows a longitudinal section of a typical electrical machine.

DETAILED DESCRIPTION OF INVENTION

FIG. 1 shows an electric motor 1 as an embodiment of the machine according to the invention and FIG. 2 shows an electric motor 101 as a typical machine. As is obvious from FIGS. 1 and 2, the electric motors 1 and 101 have a rotor 2, which is rotatable around its rotational axis, and a stator 3. The stator 3 is enclosed by a housing 4, which is formed by a housing pot 5 and a housing lid 6. The housing pot 5 has a cylindrical outer wall arranged in a rotationally-symmetrical manner around a rotational axis of the rotor 2 and a base, which is arranged diametrically opposite to the housing lid 6 viewed axially. The housing lid 6 is fastened on the outer wall of the housing pot 5 using a housing lid screw 7. A housing interior 10, through which a coolant liquid can flow and which is therefore liquid-cooled, is formed in the housing 4. A winding assembly 11, which is implemented rotationally-symmetric around a rotational axis of the rotor 2, is arranged in the housing interior 10. Because the winding assembly 11 is arranged in the housing interior 10, the winding assembly 11 can be cooled by the coolant liquid. Viewed in the axial direction, the winding assembly 11 has a first winding head 12 and a second winding head 13 on the respective ends. Furthermore, the winding assembly 11 has a first winding stand 14 and a second winding stand 15, wherein the winding stands 14, 15 extend perpendicularly to the rotational axis of the rotor 2 and support the winding assembly 11 radially outward against the housing pot 5. An effective region 16 of the winding assembly 11, in which the winding assembly 11 is configured to interact electrodynamic ally with the rotor in such a manner that the rotor can be rotationally driven by the effective region 16 of the winding assembly 11, is located in axial extension between the first winding stand 14 and the second winding stand 15. The first winding head 12 is arranged on the first winding stand 14 and the second winding head 13 is arranged on the second winding stand 15 facing away from the effective region 16 of the winding assembly 11.

The winding assembly 11 is formed, for example, by enameled wire. The enameled wire has straight sections, in which the enameled wire is laid axially extending in the winding assembly 11, and deflection sections, using which the enameled wire is laid curved from one straight section to the next straight section. Because the straight section extends in the axial direction, the straight section can be in electrodynamic interaction with the rotor 2, whereby the straight section is to be included in the effective region 16 of the winding assembly 11. The enameled wire is laid in the peripheral direction on the deflection section, for example, so that an electrodynamic interaction of the deflection section with the rotor 2 cannot occur, whereby the deflection section is to be assigned to one of the winding heads 12, 13, depending on which side the deflection section is arranged. The effective region 16 of the winding assembly 11 is therefore formed by the straight sections of the enameled wire. Similarly to the effective region 16 of the winding assembly 11, the rotor 2 has an effective region 17, which forms the electrodynamic counterpart to the effective region 16 of the winding assembly 11.

A rotor gap 18, through which cooling gas flows, whereby the rotor 2 is gas-cooled, is implemented concentrically around the rotor 2. For the hermetic insulation of the stator 3 from the rotor 2, a can 102 is installed between the rotor 2 and the stator 3 in the electric motor 101 according to FIG. 2. The can 102 is produced from a nonconductive material and is hermetically sealed using a first sealing ring 103 on the base of the housing pot 5 and using a second sealing ring 104 on the housing lid 6. The can 102 thus has an axial extension which approximately corresponds to that of the housing 4. In accordance with this resulting length for the can 102, the can is to be made correspondingly thick, so that a significant attenuation of the electrodynamic interaction between the rotor 2 and the stator 3 is caused by the air gap, which is thus larger.

The electric motor 1 according to FIG. 1, in contrast, has a housing pot ring 8 on the base of the housing pot 5 and a housing lid ring 9 on the housing lid 6. The housing pot ring 8 is arranged concentrically around the rotor 2 and extends axially from the base of the housing pot 5 over the first winding head 12 to the first winding stand 14 and therefore up to the left edge of the effective region 16 of the winding assembly 11 in FIG. 1. In a similar way, the housing lid ring 9 is arranged concentrically around the rotor 2 and extends axially from the housing lid 6 over the second winding head 13 to the second winding stand 15 and therefore to the right edge of the effective region 16 of the winding assembly 11 in FIG. 1. The housing pot ring 8 and the housing lid ring 9 have the same diameter and are arranged in the axial spacing to one another which corresponds to the axial extension of the effective region 16 of the winding assembly 11. A can 19, which is produced from an electrically nonconductive fiber composite material and has the same diameter as the housing pot ring 8 and the housing lid ring 9, is arranged between the housing pot ring 8 and the housing lid ring 9. The radially internal end of the first winding stand 14 is in touch contact with the left end of the can 19 in FIG. 1 and the radially internal end of the second winding stand 15 is in touch contact with the right end of the can 19 in FIG. 1. A sealing ring 20, 21 is arranged between the radially internal ends of the winding stands 14, 15 in each case, wherein a hermetic seal between the can 19 and the winding stands 14, 15 is achieved using the sealing rings. Furthermore, sealing ring carriers 22, 24 are fastened in a hermetically sealed manner on the radially internal ends of the winding stands 14, 15, wherein the first sealing ring carrier 22 on the first winding stand 14 extends away from the effective region 16 of the winding assembly 11 and the second sealing ring carrier 24 on the second winding stand 15 extends away from the effective region 16. The first sealing ring carrier 22 is arranged radially outside the housing pot ring 8 and directly adjacent thereto. Similarly, the second sealing ring carrier 24 is arranged radially outside the housing lid ring 9 and directly adjacent thereto. A third sealing ring 23 is installed between the first sealing ring carrier 22 and the housing pot ring 8 and a fourth sealing ring 25 is installed between the second sealing ring carrier 24 and the housing lid ring 9, wherein hermetic seals are produced using the sealing rings 23, 25.

The housing pot ring 8, the can 19, and the housing lid ring 9 are arranged axially aligned adjacent to one another. A first axial gap 26 is provided between the can 19 and the housing pot ring 8 and a second axial gap 27 is provided between the housing lid ring 9 and the can 19, so that in the event of a corresponding thermal expansion during operation of the electric motor 1, the can 19 cannot come into touch contact with the housing pot ring 8 and the housing lid ring 9. By providing the sealing rings 20, 21, 23, and 25 and the sealing ring carriers 22, 24, it is therefore possible for the can 19 to remain free of tensions, even in the event of a corresponding expansion, through the provision of the axial gaps 26, 27, although the housing interior 10 is hermetically separated from the rotor gap 18.

The invention claimed is:

1. An electrical machine, comprising:
   a rotor,
   a stator housing,
   a winding assembly, which encloses the rotor and is arranged in the stator housing, the winding assembly having an axially extending effective region in which the winding assembly is configured to electrodynamically interact with an axially-corresponding effective region of the rotor,
   wherein the stator housing has, on a side facing toward the rotor, a peripheral opening slot, which corresponds in its axial extension to axial extension of the effective region of the winding assembly,
   wherein the electrical machine comprises an electrically non-conductive can, which is inserted into the opening slot, and which is sealed with the stator housing in such a manner that the winding assembly is hermetically separated from the rotor,
   wherein the electrically non-conductive can extends axially only on the effective region of the winding assembly that is configured to electrodynamically interact with the axially-corresponding effective region of the rotor,
   wherein the stator housing comprises at least two housing rings, including a first housing ring attached to a housing pot of the stator housing and a second housing ring attached to a housing lid which closes the housing pot of the stator housing,
   wherein the first housing ring, the can, and the second housing ring are arranged axially aligned adjacent to one another,
   wherein a first axial gap is provided between the can and the first housing ring, wherein a second axial gap is provided between the second housing ring and the can, wherein the first and second axial gaps respectively bound mutually opposed ends of the effective region of the winding assembly where the electrically non-conductive can extends, and
   wherein the first and second axial gaps prevent the can from coming into contact with the first and second housing rings respectively in event of corresponding thermal expansion during operation of the electrical machine.

2. The electrical machine as claimed in claim 1, wherein the housing rings of the stator housing enclose the rotor on a radial interior and are arranged in axial spacing to one another so that the housing rings extend up to the effective region of the winding assembly, wherein the opening slot is delimited by the housing rings.

3. The electrical machine as claimed in claim 2, wherein the housing rings and the can have a same diameter.

4. The electrical machine as claimed in claim 1, wherein the first housing ring is welded onto the housing pot and the second housing ring is welded onto the housing lid.

5. The electrical machine as claimed in claim 1, wherein the winding assembly has a winding head arranged on each of respective axial ends, which is not to be included in the effective region of the winding assembly.

6. The electrical machine as claimed in claim 5, wherein the winding assembly has at least one winding stand, using which the winding assembly is supported against the stator housing, wherein each winding stand is arranged on one of axial delimitations of the effective region and extends radially up to the adjacent axial end of the can.

7. The electrical machine as claimed in claim 6, wherein a radially internal end of each winding stand is hermetically sealed with an axial end of the can arranged adjacent and also with one of the housing rings arranged adjacent.

8. The electrical machine as claimed in claim 7, wherein a sealing ring carrier is fastened hermetically sealed on each of the at least winding stand for sealing the radially internal end of each winding stand with the can arranged adjacent, wherein a sealing ring for sealing the winding stand against said one of the housing rings is arranged in each case between the sealing ring carrier and said one of the housing rings arranged adjacent.

9. The electrical machine as claimed in claim 7, wherein a sealing ring, for sealing the winding stand in relation to the can, is arranged respectively between the radially internal end of each winding stand and the axial end of the can arranged adjacent.

10. The electrical machine as claimed in claim 1, wherein the stator housing is produced from metal and the can is produced from fiber composite material.

11. The electrical machine as claimed in claim 1, wherein the electrical machine is a canned electric motor.

* * * * *